United States Patent
Ishino

(10) Patent No.: US 12,003,181 B2
(45) Date of Patent: Jun. 4, 2024

(54) BUCK DC/DC CONVERTER, CONTROLLER THEREOF AND CONTROLLING METHOD THEREOF, AND ELECTRONIC DEVICE

(71) Applicant: ROHM CO., LTD., Kyoto (JP)

(72) Inventor: Tsutomu Ishino, Kyoto (JP)

(73) Assignee: ROHM CO., LTD., Kyoto (JP)

(*) Notice: Subject to any disclaimer, the term of this patent is extended or adjusted under 35 U.S.C. 154(b) by 307 days.

(21) Appl. No.: 17/698,019

(22) Filed: Mar. 18, 2022

(65) Prior Publication Data
US 2022/0302842 A1  Sep. 22, 2022

(30) Foreign Application Priority Data
Mar. 22, 2021 (JP) ................. 2021-047627

(51) Int. Cl.
| | |
|---|---|
| H02M 3/158 | (2006.01) |
| H02M 1/00 | (2006.01) |
| H02M 1/08 | (2006.01) |
| H02M 1/32 | (2007.01) |
| H02M 3/157 | (2006.01) |

(52) U.S. Cl.
CPC ....... H02M 3/1588 (2013.01); H02M 1/0009 (2021.05); H02M 1/08 (2013.01); H02M 1/32 (2013.01); H02M 3/157 (2013.01)

(58) Field of Classification Search
CPC .... H02M 3/1588; H02M 1/0009; H02M 1/08; H02M 1/32; H02M 3/157
See application file for complete search history.

(56) References Cited

U.S. PATENT DOCUMENTS

| | | | | |
|---|---|---|---|---|
| 2008/0224674 A1* | 9/2008 | Hasegawa | ............. | H02M 3/158 323/282 |
| 2022/0302839 A1* | 9/2022 | Ishino | ................... | H02M 3/158 |
| 2023/0318442 A1* | 10/2023 | Scoones | ............. | H02M 3/1584 363/13 |

FOREIGN PATENT DOCUMENTS

JP     2020162248 A     10/2020

* cited by examiner

*Primary Examiner* — Kyle J Moody
(74) *Attorney, Agent, or Firm* — CANTOR COLBURN LLP

(57) ABSTRACT

The present disclosure relates to a buck DC/DC converter, a controller thereof and controlling method thereof, and an electronic device. A pulse modulator generates a pulse modulation signal such that an output of the buck DC/DC converter is pulse-modulated to approach a target state. An overcurrent detection circuit compares a low-side current flowing through a low-side transistor with a predetermined overcurrent threshold value to generate an overcurrent detection signal that is asserted when the low-side current is greater than the overcurrent threshold value. (i) In a first mode, the control pulse that is input to the driver circuit corresponds to the pulse modulation signal, and (ii) in a second mode, the control pulse takes a second level for a period during which the overcurrent detection signal is asserted and takes a first level during a fixed on time after the overcurrent detection signal is negated.

20 Claims, 12 Drawing Sheets

BUCK DC/DC CONVERTER, CONTROLLER THEREOF AND CONTROLLING METHOD THEREOF, AND ELECTRONIC DEVICE

CROSS REFERENCES TO RELATED APPLICATIONS

The present invention claims priority under 35 U.S.C. § 119 to Japanese Application No. 2021-047627, filed on Mar. 22, 2021, the entire contents of which being incorporated herein by reference.

TECHNICAL FIELD

The present disclosure relates to a direct current (DC)/DC converter (switch regulator).

BACKGROUND

Various electronic devices such as smartphones, tablet computers, on-vehicle devices and office automation (OA) devices are equipped with circuit components that need power supply voltages lower than a battery voltage or an external power supply voltage. Buck DC/DC converters are used in order to provide such circuit components with appropriate power supply voltages.

PRIOR ART DOCUMENT

Patent Publication

[Patent document 1] Japan Patent Publication No. 2020-162248

SUMMARY

Problems to be Solved by the Present Disclosure

If an output line of a buck converter is short to the ground, a coil current flowing through an inductor increases, and a large current then flows into a high-side transistor and a low-side transistor. To prevent the issue above, a controller of a buck converter is required to have an overcurrent protection function.

The present disclosure is completed in view of the background above. It is an illustrative object of one aspect of the present disclosure to provide a controller of a DC/DC converter having an overcurrent protection function.

Technical Means for Solving the Problem

The present disclosure in an aspect relates to a controller for a synchronous rectification type buck DC/DC converter including a high-side transistor and a low-side transistor. The controller includes: a pulse modulator, generating a pulse modulation signal, wherein a first level and a second level of the pulse modulation signal are taken such that an output of the buck DC/DC converter is pulse-modulated to approach a target state, the first level instructing the high-side transistor to be turned on and the low-side transistor to be turned off, and the second level instructing the high-side transistor to be turned off and the low-side transistor to be turned on; an overcurrent detection circuit, comparing a low-side current flowing through the low-side transistor with a predetermined overcurrent threshold value to generate an overcurrent detection signal that is asserted when the low-side current is greater than the overcurrent threshold value; a switch control circuit, at least based on the overcurrent detection signal and the pulse modulation signal, generating a control pulse that takes a first level during a period when the high-side transistor should be on and the low-side transistor should be off, and takes a second level during a period when the high-side transistor should be off and the low-side transistor should be on; and a driver circuit, driving the high-side transistor and the low-side transistor in response to the control pulse. (i) In a first mode, the control pulse corresponds to the pulse modulation signal, and (ii) in a second mode, the control pulse takes the second level for the period during which the overcurrent detection signal is asserted and takes the first level during a fixed on time after the overcurrent detection signal is negated.

Moreover, any form obtained by arbitrary combinations of the elements above and any form obtained by conversions between expressions of the elements in terms of methods, devices and systems of the present disclosure are considered as effectively forms of the present disclosure.

Effects of the Present Disclosure

Overcurrent protection in a synchronous rectification type DC/DC converter is achieved according to an aspect of the present disclosure.

DETAILED DESCRIPTION OF THE EMBODIMENTS

Summary of the Embodiments

Figure 1:
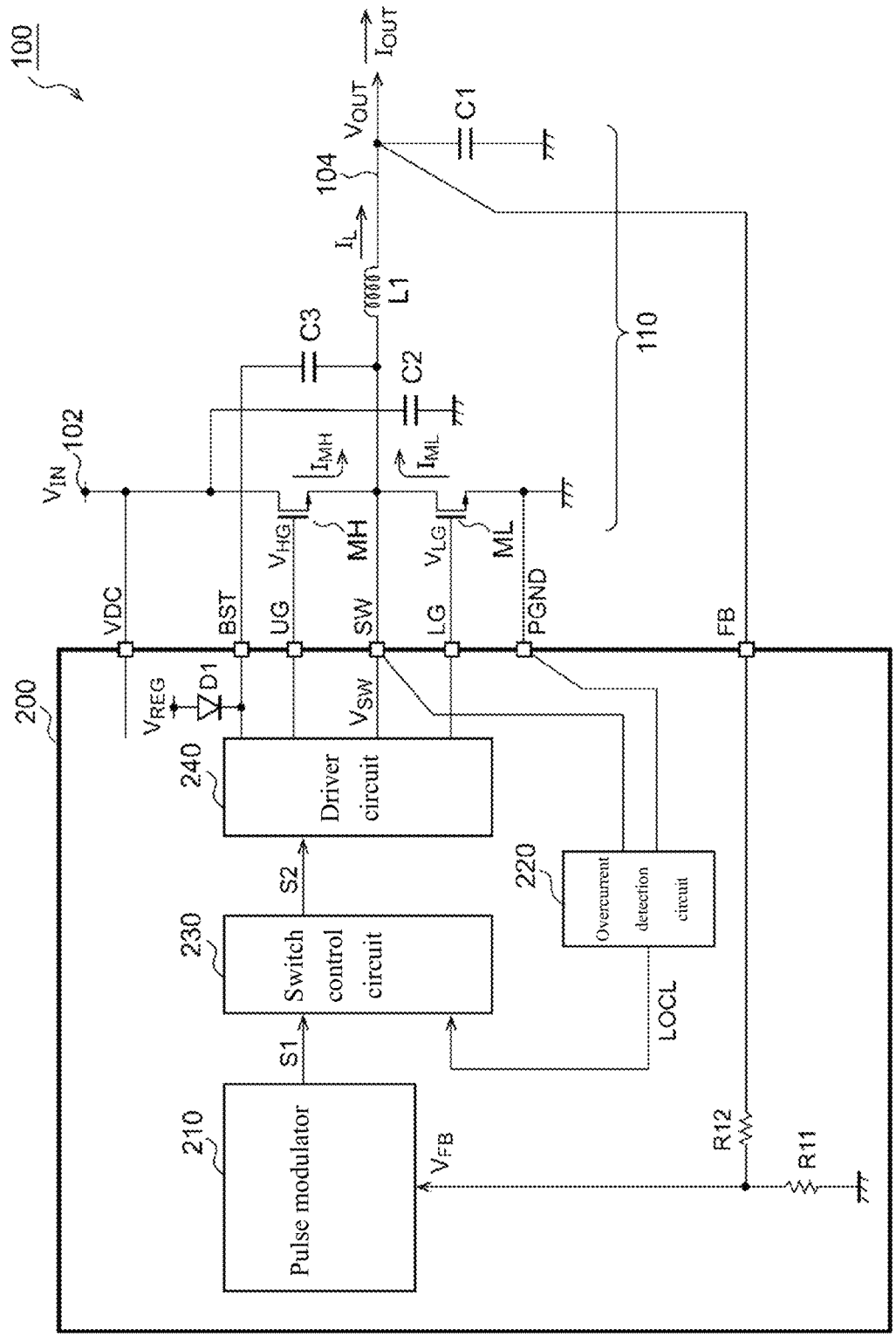
FIG. 1 is a block diagram of a DC/DC converter according to an embodiment.

A summary of several illustrative embodiments of the present disclosure is given below. The summary serves as the preamble of the detailed description to be given shortly, and aims to provide fundamental understanding of the embodiments by describing several concepts of one or more embodiments in brief. It should be noted that the summary is not to be construed as limitations to the scope of the present disclosure. Moreover, the summary does not necessarily encompass all conceivable embodiments, and does not provide definitions for essential constituent elements of the embodiments. For the sake of better description, "one embodiment" is used to refer to one embodiment (an implementation example or a variation example) or multiple embodiments (implementation examples or variation examples) disclosed in this specification.

A controller according to one embodiment is used for controlling a synchronous rectification type buck DC/DC converter including a high-side transistor and a low-side transistor. The controller includes: a pulse modulator, generating a pulse modulation signal, wherein a first level and a second level of the pulse modulation signal are taken such that an output of the buck DC/DC converter is pulse-modulated to approach a target state, the first level instructing the high-side transistor to be turned on and the low-side transistor to be turned off, and the second level instructing the high-side transistor to be turned off and the low-side transistor to be turned on; an overcurrent detection circuit, comparing a low-side current flowing through the low-side transistor with a predetermined overcurrent threshold value to generate an overcurrent detection signal that is asserted when the low-side current is greater than the overcurrent threshold value; a switch control circuit, at least based on the overcurrent detection signal and the pulse modulation signal, generating a control pulse that takes a first level during a period when the high-side transistor should be on and the low-side transistor should be off, and takes a second level during a period when the high-side transistor should be off and the low-side transistor should be on; and a driver circuit, driving the high-side transistor and the low-side transistor in response to the control pulse. (i) In a first mode, the control pulse corresponds to the pulse modulation signal, and (ii) in a second mode, the control pulse takes the second level for the period during which the overcurrent detection signal is asserted and takes the first level during a fixed on time after the overcurrent detection signal is negated.

According to the configuration above, overcurrent protection based on a low-side current flowing through a low-side transistor can be achieved. More specifically, in the presence of a factor that causes an overcurrent, a low-side current is limited within an overcurrent protection range having an overcurrent threshold value as a lower limit. Moreover, in the term "fixed on time", "fixed" means being unaffected by a main feedback loop (that is, a duty cycle of the pulse modulation). In other words, it is generated by a timer and the fixed on time is adjustable; that is to say, it is variable and is not necessarily a fixed and constant period of time.

In one embodiment, the switch control circuit, in the second mode when the pulse modulation signal is at the first level and while the overcurrent detection signal is negated, is kept in the second mode; and in the second mode when the pulse modulation signal is at the second level while the overcurrent detection signal is negated, shifts to the first mode.

In one embodiment, the switch control circuit shifts to the second mode when the overcurrent detection signal is asserted in the first mode.

In one embodiment, the switch control circuit may include a timer circuit that operates with shifting of the control pulse to the second level as a trigger to measure the fixed on time; when the overcurrent detection signal is negated, the pulse modulation signal is output as the control pulse, when the overcurrent detection signal is asserted, the control pulse is set as the second level, when the pulse modulation signal is at the first level and while the overcurrent detection signal is negated, the control pulse is set to the first level during the fixed on time, and when the pulse modulation signal is at the second level and while the overcurrent detection signal is negated, the pulse modulation signal is output as the control pulse.

A controller according to one embodiment includes: a pulse modulator, generating a pulse modulation signal, wherein a first level and a second level of the pulse modulation signal are taken such that an output of the buck DC/DC converter is pulse-modulated to approach a target state, the first level instructing the high-side transistor to be turned on and the low-side transistor to be turned off, and the second level instructing the high-side transistor to be turned off and the low-side transistor to be turned on; an overcurrent detection circuit, comparing a low-side current flowing through the low-side transistor with a predetermined overcurrent threshold value to generate an overcurrent detection signal that is asserted when the low-side current is greater than the overcurrent threshold value; a switch control circuit, at least based on the overcurrent detection signal and the pulse modulation signal, generating a control pulse that takes a first level during a period when the high-side transistor should be on and the low-side transistor should be off, and takes a second level during a period when the high-side transistor should be off and the low-side transistor should be on; and a driver circuit, driving the high-side transistor and the low-side transistor in response to the control pulse. The switch control circuit, when the overcurrent detection signal is negated, outputs the pulse modulation signal as the control pulse, when the overcurrent detection signal is asserted, sets the control pulse as the second level, when the pulse modulation signal is at the first level and while the overcurrent detection signal is negated, sets the control pulse to the first level during a fixed on time, and when the pulse modulation signal is at the second level and while the overcurrent detection signal is negated, outputs the pulse modulation signal as the control pulse.

According to the configuration above, overcurrent protection based on a low-side current flowing through a low-side transistor can be achieved. More specifically, in the presence of a factor that causes an overcurrent, a low-side current and a high-side current can be limited within a current range having an overcurrent threshold value as a lower limit. The amplitude of the current range may be designed according to the fixed on time.

In one embodiment, the overcurrent detection circuit may compare a voltage across the low-side transistor with a threshold voltage corresponding to the overcurrent threshold value. Accordingly, a low-side current can be detected with low loss based on an on resistance of a low-side transistor.

In one embodiment, the overcurrent detection circuit may include: a first transistor and a current source, connected in series between a power supply line and a ground line connected to one end of the low-side transistor, wherein the current source is disposed between a gate and a drain of the first transistor; a second transistor and a first resistor, connected in series between the power supply line and a switching line connected to the other end of the low-side transistor, wherein a gate of the second transistor is connected to the gate of the first transistor; a third transistor, a second resistor and an impedance element, connected in series between the power supply line and the ground line, wherein a gate of the third transistor is connected to the gate of the first transistor; and a voltage comparator, comparing a voltage of a connection node of the first resistor and the second transistor with a voltage of a connection node of the second resistor and the third transistor.

In one embodiment, the overcurrent detection circuit may include: a differential amplifier, including a tail current source, an input differential pair having a P-channel metal oxide semiconductor (PMOS) transistor or a PNP bipolar transistor, and a resistor-load circuit with unbalanced impedance; and a voltage comparator, comparing voltages of two connection nodes of the input differential pair with the resistor-load circuit, wherein one of the input differential pair is connected to a first end of the low-side transistor, and the other of the input differential pair is connected to a second end of the low-side transistor.

In one embodiment, the overcurrent detection circuit may include: a differential amplifier, including a tail current source, an input differential pair having a PMOS transistor or a PNP bipolar transistor, a current mirror load, and an impedance element inserted between one of the input differential pair and the tail current source; and an output stage, binarizing voltages of the input differential pair and one of two connection nodes of the current mirror load.

In one embodiment, the fixed on time may be shorter when an input voltage of the buck DC/DC converter is higher. Accordingly, the fluctuation of an overcurrent protection range can be inhibited.

In one embodiment, the fixed on time may be longer when an output voltage of the buck DC/DC converter is higher. Accordingly, the fluctuation of an overcurrent protection range can be inhibited.

In one embodiment, the fixed on time may be inversely proportional to a difference between the input voltage and the output voltage of the buck DC/DC converter. Accordingly, a fluctuation amplitude of a coil current can be kept constant.

In one embodiment, the timer circuit may include: a capacitor; a variable current source, generating a current proportional to a difference between an input voltage and an output voltage of the buck DC/DC converter, and supplying the current to the capacitor; a switch, disposed in parallel with the capacitor; and a voltage comparator, comparing a voltage of the capacitor with a predetermined threshold voltage.

In one embodiment, the controller may be integrated on a semiconductor substrate.

EMBODIMENTS

Details of the preferred embodiments of the present disclosure are specifically given with the accompanying drawings below. The same or equivalent constituting elements, parts and processes in the accompanying drawings are represented by the same denotations, and repeated description is omitted as appropriate. Moreover, the embodiments are illustrative and are non-limiting to the present disclosure or the scope of the disclosure. All features and combinations thereof described in the embodiments are not necessarily intrinsic characteristics of the present disclosure.

In this specification, an expression "a state of component A connected to component B" further includes, in addition to a situation where component A and component B are directly physically connected, a situation where component A is indirectly connected to component B via another component, and the indirect connection does not produce substantial influences on their electrical connection or does not impair functions or effects exerted by their connection.

Similarly, an expression "a state of component C disposed between component A and component B" further includes, in addition to a situation where component A and component C, or component B and component C are directly connected, an indirect connection via another component, and the indirect connection does not produce substantial influences on their electrical connection or does not impair functions or effects exerted by their connection.

FIG. 1 shows a block diagram of a DC/DC converter 100 according to an embodiment. The DC/DC converter 100 is a buck DC/DC converter, receives a DC input voltage $V_{IN}$ at an input terminal (an input line) 102, generates an output voltage $V_{OUT}$ stabilized at a predetermined target value $V_{OUT(REF)}$, and supplies the output voltage $V_{OUT}$ to a load connected to an output terminal (an output line) 104.

The DC/DC converter 100 includes a controller 200 and a peripheral circuit 110. The DC/DC circuit 100 is a synchronous rectification type, and the peripheral circuit 110 includes a high-side transistor (a switching transistor) MH, a low-side transistor (a synchronous rectification transistor) ML, an inductor L1, an output capacitor C1, an input capacitor C2 and a bootstrap capacitor C3. The high-side transistor MH and the low-side transistor ML may be metal oxide semiconductor field effect transistors (MOSFETs), insulated gate bipolar transistors (IGBTs), or bipolar transistors.

In this embodiment, the high-side transistor MH is an N-channel transistor, and the bootstrap capacitor C3 forms a bootstrap circuit.

The controller 200 controls the high-side transistor MH and the low-side transistor ML such that an output state of the DC/DC converter 100 approaches a target state.

An input voltage pin (terminal) VDC of the controller 200 is supplied with the input voltage $V_{IN}$. A bootstrap pin BST of the controller 200 is connected to the bootstrap capacitor C3. A high-side gate pin UG is connected to a control terminal (a gate) of the high-side transistor MH, and a low-side gate pin LG is connected to a control terminal (a gate) of the low-side transistor ML. A ground pin PGND is grounded. A feedback pin FB is fed with a signal (the output voltage $V_{OUT}$ in this embodiment) corresponding to the output state of the DC/DC converter 100. Moreover, a switching terminal SW is connected to a connection node (a switching line) of the high-side transistor MH and the low-side transistor ML.

The controller 200 primarily includes a pulse modulator 210, an overcurrent detection circuit 220, a switch control circuit 230 and a driver circuit 240, and is a functional integrated circuit (IC) integrated on a semiconductor substrate. In addition, the high-side transistor MH and the low-side transistor ML may also be integrated in the controller 200.

The pulse modulator 210 generates a pulse modulation signal S1 such that an output of the buck DC/DC converter 100 approaches a target state.

In this embodiment, in the pulse modulator 210, resistors R11 and R12 are used to divide the output voltage $V_{OUT}$, and a feedback signal $V_{FB}$ after voltage dividing is input to the pulse modulator 210. The pulse modulator 210 generates the pulse modulation signal S1 such that the feedback signal $V_{FB}$ approaches its target value $V_{REF}$. With feedback performed by the pulse modulator 210, the output voltage $V_{OUT}$ is stabilized at the following target voltage $V_{OUT(REF)}$.

$$V_{OUT(REF)} = V_{REF} * (R11+R12)/R11$$

The pulse modulation signal S1 may be a pulse width modulation (PWM) signal having a constant period but a varying duty cycle (a pulse width), and the pulse modulator

210 may be, for example but not limited to, a PWM modulator. In addition to PWM, pulse frequency modulation (PFM) may also be used.

The configuration of the pulse modulator 210 is not specifically defined, and any commonly known technique may be used. For example, the pulse modulator 210 may be a so-called voltage mode pulse width modulator, and may include: an error amplifier, amplifying an error between the feedback signal $V_{FB}$ corresponding to the output voltage $V_{OUT}$ and its target voltage $V_{REF}$; an oscillator, generating a triangular-wave or sawtooth-wave periodic signal; and a PWM comparator, comparing the periodic signal with an output signal of the error amplifier to generate a PWM signal corresponding to a comparison result.

Alternatively, the pulse modulator 210 may be a peak current mode or an average current mode modulator, or may be a modulator with ripple control modulator represented by hysteresis control (Bang-Bang control), fixed bottom detection on time, and fixed peak detection off time.

The pulse modulation signal S1 takes a first level (also referred to as an on level) and a second level (an off level), wherein the first level instructs the high-side transistor MH to be turned on and the low-side transistor ML to be turned off, and the second level instructs the high-side transistor MH to be turned off and the low-side transistor ML to be turned on. In the description below, the first level of the pulse modulation signal S1 is set as high (H) and the second level is set as low (L).

The overcurrent detection circuit 220 compares a low-side current $I_{ML}$ flowing through the low-side transistor ML with a predetermined overcurrent threshold value $I_{OCPL}$ to generate an overcurrent detection signal LOCL that is asserted when the low-side current $I_{ML}$ is greater than the overcurrent threshold value $I_{OCPL}$ (set to be a high level herein).

During an on time of the low-side transistor ML, the low-side current $I_{ML}$ in the low-side transistor ML flows from the source to the drain. At this point in time, a potential difference proportional to the low-side current $I_{ML}$ is generated between the drain and the source of the low-side transistor ML. A voltage at the drain of the low-side transistor ML, that is, the pin SW, becomes:

$$V_{SW} = -IML * R_{ON}$$

In the above, $R_{ON}$ is an on resistance of the low-side transistor ML.

The overcurrent detection circuit 220 monitors the low-side current $I_{ML}$ based on a voltage across the low-side transistor ML, that is, a potential difference between the pin PGND and the pin SW, with associated details to be described below.

The switch control circuit 230 generates a control pulse S2 at least based on the overcurrent detection signal LOCL and the pulse modulation signal S1.

The control pulse S2 takes a first level during a period when the high-side transistor MH should be on and the low-side transistor ML should be off, and takes a second level during a period when the high-side transistor MH should be off and the low-side transistor ML should be on. In the description below, the first level of the control pulse S2 is set as high (H) and the second level is set as low (L).

The DC/DC converter 100 operates in two modes, namely, a first mode and a second mode. The second mode is an overcurrent state in which an overcurrent flows in the inductor L1, and may be referred to as an overcurrent protection mode. The first mode is a normal state that is a non-overcurrent state, and may be referred to as a usual mode.

The control pulse S2 is different in the first mode and the second mode. More specifically, (i) in the normal state (the first mode), the control pulse S2 corresponds to the pulse modulation signal S1. That is to say, when the pulse modulation signal S1 is at the first level, the control pulse S2 is at the first level; when the pulse modulation signal S1 is at the second level, the control pulse S2 is at the second level.

(ii) In the overcurrent state (the second mode), the control pulse S2 takes the second level (low) when the overcurrent detection signal LOCL is asserted, and takes the first level (high) during a fixed on time TA after the overcurrent detection signal LOCL is negated.

The driver circuit 240 drives the high-side transistor MH and the low-side transistor ML in response to the control pulse S2. More specifically, the driver circuit 240 shifts the level of the control pulse S2 to generate a high-side gate signal $V_{HG}$ and outputs the high-side gate signal $V_{HG}$ from the pin UG. Moreover, the driver circuit 240 generates a low-side gate signal $V_{LG}$ having logic complementary to the control pulse S2 and outputs the low-side gate signal $V_{LG}$ from the pin LG. Further, the switch control circuit 230 may also output the high-side control pulse S2 and a low-side control pulse S2'.

The driver circuit 240 is additionally provided with a diode D1 as a rectification element. The diode D1 and the externally provided bootstrap capacitor C3 together form a bootstrap circuit. A cathode of the diode D1 is connected to the bootstrap capacitor C3 through the pin BST, and an anode of the diode D1 is supplied with a constant voltage $V_{REG}$. The pin BST generates a bootstrap voltage $V_{BST}$ higher than the pin SW by the constant voltage $V_{REG}$ in conjunction with switching of the high-side transistor MH and the low-side transistor ML. The driver circuit 240 outputs the high-side gate signal $V_{HG}$, and the high-side gate signal $V_{HG}$ sets the bootstrap voltage $V_{BST}$ to high and sets the voltage $V_{SW}$ of the switching line to low.

The configuration of the DC/DC converter 100 is as described above. The operation of the DC/DC converter 100 is to be described below.

Figure 2:
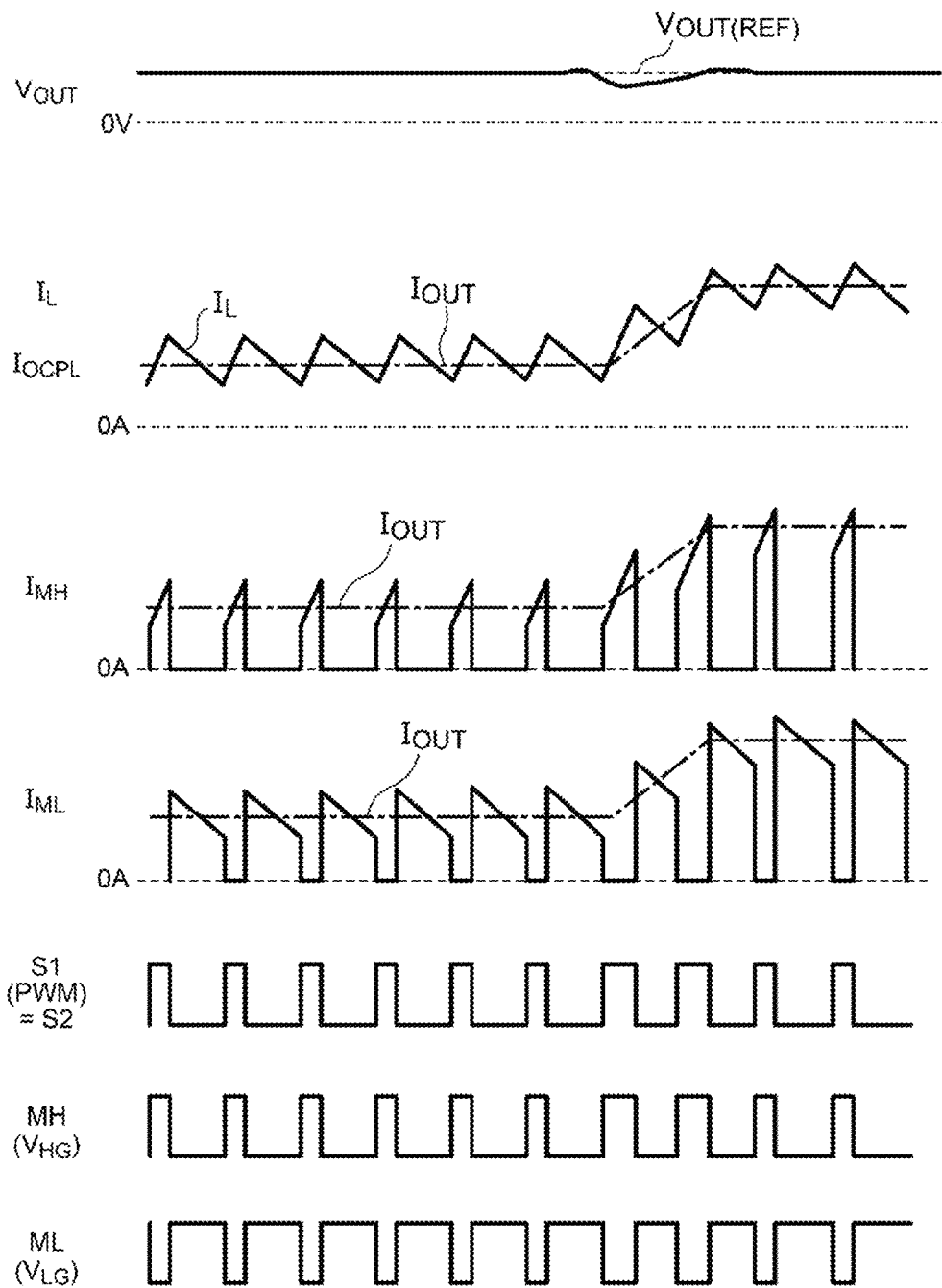
FIG. 2 is a waveform diagram of the operation in a first mode of the DC/DC converter in FIG. 1.

FIG. 2 shows a waveform diagram of the operation in a first mode of the DC/DC converter 100 in FIG. 1. In FIG. 2, from the top, the output voltage $V_{OUT}$, the coil current $I_L$ and the output current $I_{OUT}$, the high-side current I flowing through the high-side transistor MH, the low-side current $I_{ML}$ flowing through the low-side transistor ML, the pulse modulation signal S1, the on and off states (that is, the high-side gate signal $V_{HG}$) of the high-side transistor MH, and the on and off states (that is, the low-side gate signal $V_{LG}$) of the low-side transistor ML are sequentially depicted.

The output voltage $V_{OUT}$ is kept constant by means of feedback control. The output current $I_{OUT}$ supplied to a load (not shown) is an average value of the coil current $I_L$.

In a stable state in which the output current $I_{OUT}$ is constant, a duty cycle DUTY of the pulse modulation signal S1 is stabilized close to a value of the equation below:

$$\text{DUTY} = V_{OUT}/V_{IN} \quad (1)$$

As shown in FIG. 2, when the output current $I_{OUT}$ increases, in a microscopic aspect, the output voltage $V_{OUT}$ becomes lower than the target voltage $V_{OUT(REF)}$, and so a feedback with an increased duty cycle DUTY and an increased coil current $I_L$ is returned. Then, when the output current $I_{OUT}$ again becomes stable, the duty cycle of the pulse modulation signal S1 is converged close to the value of equation (1).

The operation in the first mode of the DC/DC converter 100 is as described above. The operation in the second mode is to be described below.

Figure 3:
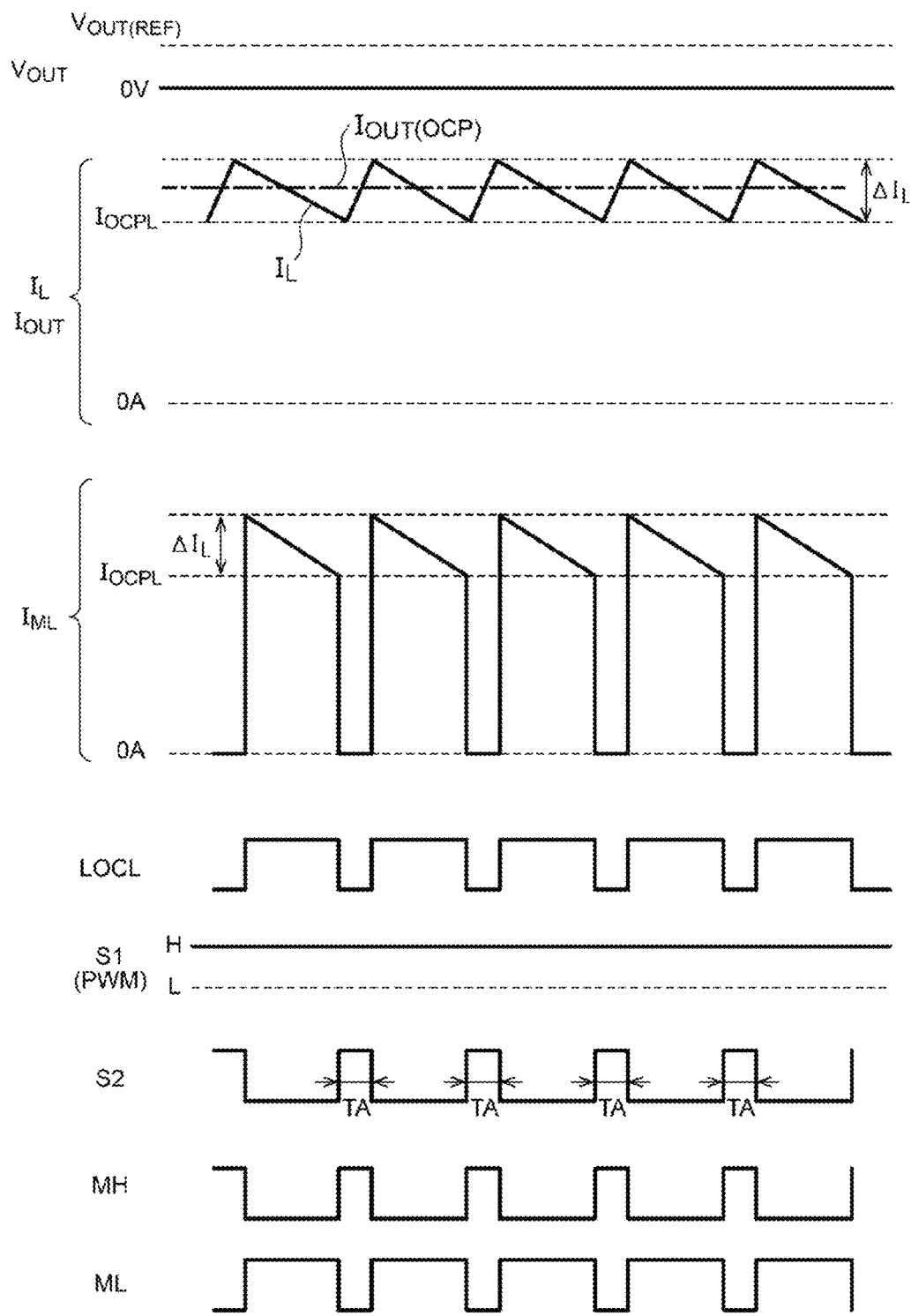
FIG. 3 is a waveform diagram of the operation in a second mode of the DC/DC converter in FIG. 1.

FIG. 3 shows a waveform diagram of the operation in the second mode of the DC/DC converter 100 in FIG. 1. Herein, an overcurrent is produced because the output line 104 is short to the ground (or a short circuit of a load).

In FIG. 3, from the top, the output voltage $V_{OUT}$, the coil current $I_L$ and the output current $I_{OUT}$, the low-side current $I_{ML}$ flowing through the low-side transistor ML, the overcurrent detection signal LOCL, the pulse modulation signal S1, the on and off states (that is, the high-side gate signal $V_{HG}$) of the high-side transistor MH, and the on and off states (that is, the low-side gate signal $V_{LG}$) of the low-side transistor ML are sequentially depicted.

In a state in which the output line 104 is short to the ground, the output voltage $V_{OUT}$ drops to close to 0 V. As a result, the duty cycle of the pulse modulation signal S1 generated by the pulse modulator 210 is fixed at 100%, and the pulse modulation signal S1 is kept at a high level.

The overcurrent detection signal LOCL is at high (asserted) when the low-side current $I_{ML}$ is greater than a threshold current $I_{OCPL}$, and is at low (negated) when the low-side current $I_{ML}$ is smaller than the threshold current $I_{OCPL}$. During an off time of the low-side transistor ML, no low-side current $I_{ML}$ flows, and so the overcurrent detection signal LOCL is at low.

In the second mode, the control pulse S2 is fixed at the second level (low) during the period when the overcurrent detection signal LOCL is high (asserted). If the low-side transistor ML stays on, the coil current $I_L$, that is, the low-side current $I_{ML}$, reduces with time and eventually becomes smaller than the threshold current $I_{OCPL}$, the overcurrent detection signal LOCL becomes at low, the control pulse S2 is released from being low, and the control pulse S2 shifts to high. Then, the control pulse S2 stays high during the predetermined on time TA. During the period in which the control pulse S2 is at high, the high-side transistor MH is on, the low-side transistor ML is off, and the coil current $I_L$ increases with time.

During the on time of the high-side transistor MH, one end (the terminal SW) of the inductor L1 is applied with the input voltage $V_{IN}$, and the other end (the output line 104) of the inductor L1 is applied with the output voltage $V_{OUT}$. That is to say, a voltage ΔV across the inductor L1 is $V_{IN}$-$V_{OUT}$, and so the coil current $I_L$ increases with time by a slope $dI_L/dt$.

$$dI_L/dt = \Delta V/L = (V_{IN} - V_{OUT})/L$$

An increment $\Delta I_L$ of the coil current $I_L$ within the on time TA is:

$$\Delta I_L = dI_L/dt*TA = (V_{IN} - V_{OUT})/L*TA.$$

After the control pulse S2 becomes at the first level, that is, after the time TA has elapsed from turning on of the high-side transistor MH, the control pulse S2 becomes at the second level, and the low-side transistor ML is turned on. At this point in time, the coil current $I_L$, that is, the low-side current $I_{ML}$ becomes $I_{OCPL}+\Delta I_L$, and so $I_{ML}>I_{OCPL}$ is established, and the overcurrent detection signal LOCL is substantially set to high (asserted) while the low-side transistor ML is on. Then, the low-side transistor ML stays on until the low-side current $I_{ML}$ is smaller than the threshold current $I_{OCPL}$.

The DC/DC converter 100 repeats the operation above in the second mode. Thus, during the operation in the second mode, the coil current $I_L$ is kept within a range that has the threshold current $I_{OCPL}$ as the lower limit and $\Delta I_L$ as the amplitude.

The operation of the DC/DC converter 100 is as described above. According to the DC/DC converter 100, overcurrent protection based on the low-side current $I_{ML}$ flowing through the low-side transistor ML can be achieved. More specifically, in the presence of a factor that causes an overcurrent, the low-side current $I_{ML}$ and the high-side current $I_{MH}$ are limited within a current range having an overcurrent threshold value as a lower limit. The current range amplitude $\Delta I_L$ may be designed according to the fixed on time TA.

Next, shifting between the first mode and the second mode is to be described below.

The switch control circuit 230 may operate in the second mode when the pulse modulation signal S1 is kept at high, and operate in the first mode when the pulse modulation signal S1 repeatedly alternates between high and low.

For example, during the operation in the second mode, the switch control circuit 230 is kept in the second mode when the pulse modulation signal S1 is at the first level (high) and while the overcurrent detection signal LOCL is negated. That is to say, the control pulse S2 shifts to the first level as the overcurrent detection signal LOCL is negated, and then shifts to the second level after the fixed on time TA has elapsed.

In contrast, during the operation in the second mode, at a timing when the pulse modulation signal S1 is at the second level (low) and while the overcurrent detection signal LOCL is negated, the operation shifts to the first mode. After that, the operation is performed by using the pulse modulation signal S1 as the control pulse S2.

During the operation in the first mode, the switch control circuit 230 shifts to the second mode when the overcurrent detection signal LOCL is asserted and the control pulse S2 is fixed at the second level (low) while the overcurrent detection signal LOCL is asserted.

Figure 4:
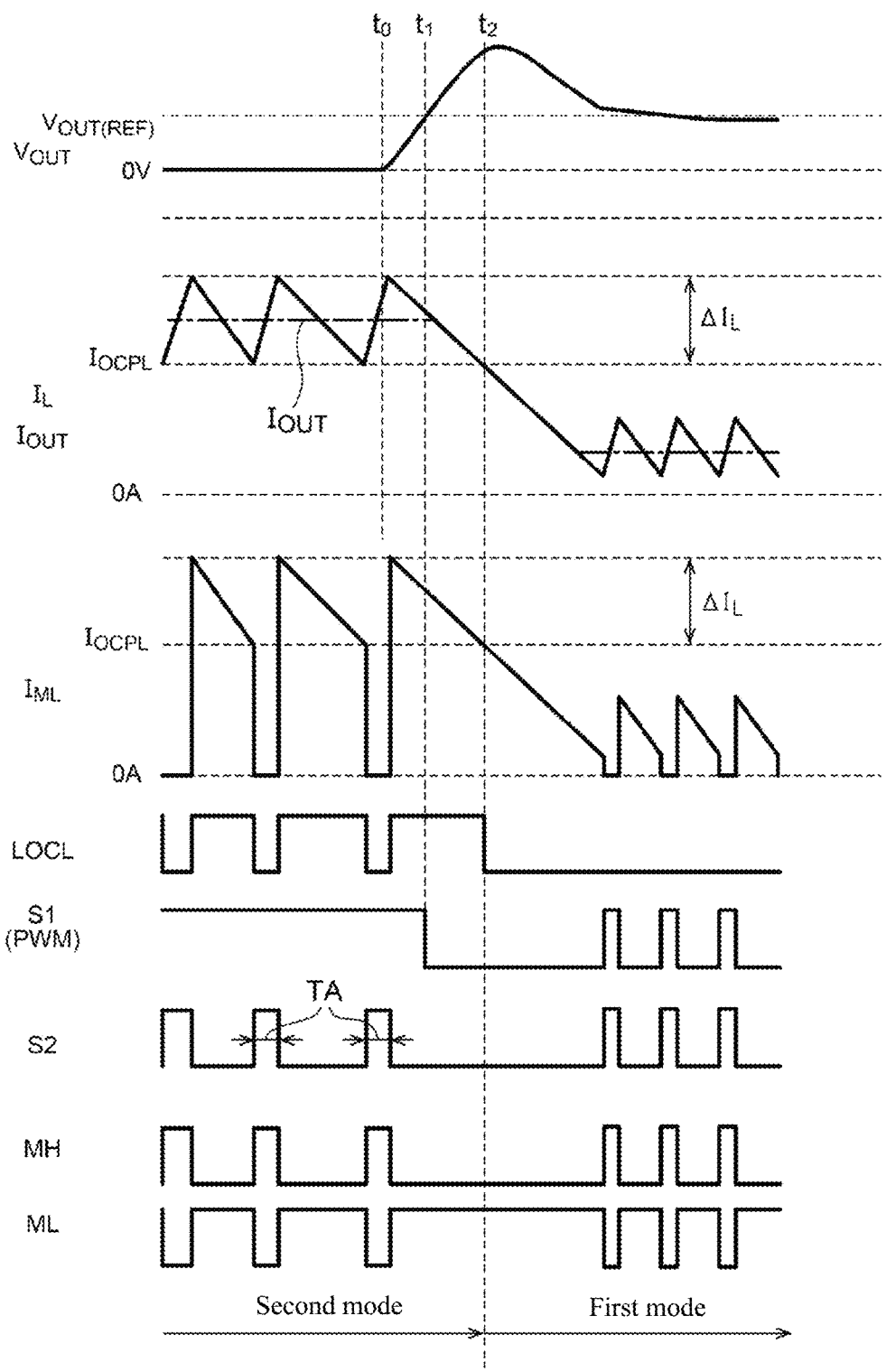
FIG. 4 is a waveform diagram illustrating shifting from a second mode to a first mode.

Shifting from the first mode to the second mode is as described above. FIG. 4 shows a waveform diagram illustrating shifting from the second mode to the first mode.

Before a timing $t_0$, the output line 104 is short to the ground, a factor causing an overcurrent is present, and the DC/DC converter 100 operates in the second mode.

At the timing $t_0$, once the factor causing the overcurrent is eliminated (a short to ground is eliminated), the output capacitor C1 is charged by the coil current $I_L$, and the output voltage $V_{OUT}$ starts rising. During the operation in the second mode, the on time TA of the high-side transistor MH is fixed, and so the output capacitor C1 is excessively charged, and the output voltage $V_{OUT}$ exceeds the target voltage $V_{OUT(REF)}$. Since the output voltage $V_{OUT}$ exceeds the target voltage $V_{OUT(REF)}$, the pulse modulation signal S1 generated by the pulse modulator 210 becomes at low at a timing $t_1$.

At a timing $t_2$, the overcurrent detection signal LOCL is negated. At this timing, the pulse modulation signal S1 is at low, and so the DC/DC converter 100 shifts to the first mode. After the timing $t_2$, the pulse modulation signal S1 becomes the control pulse S2.

Figure 5:
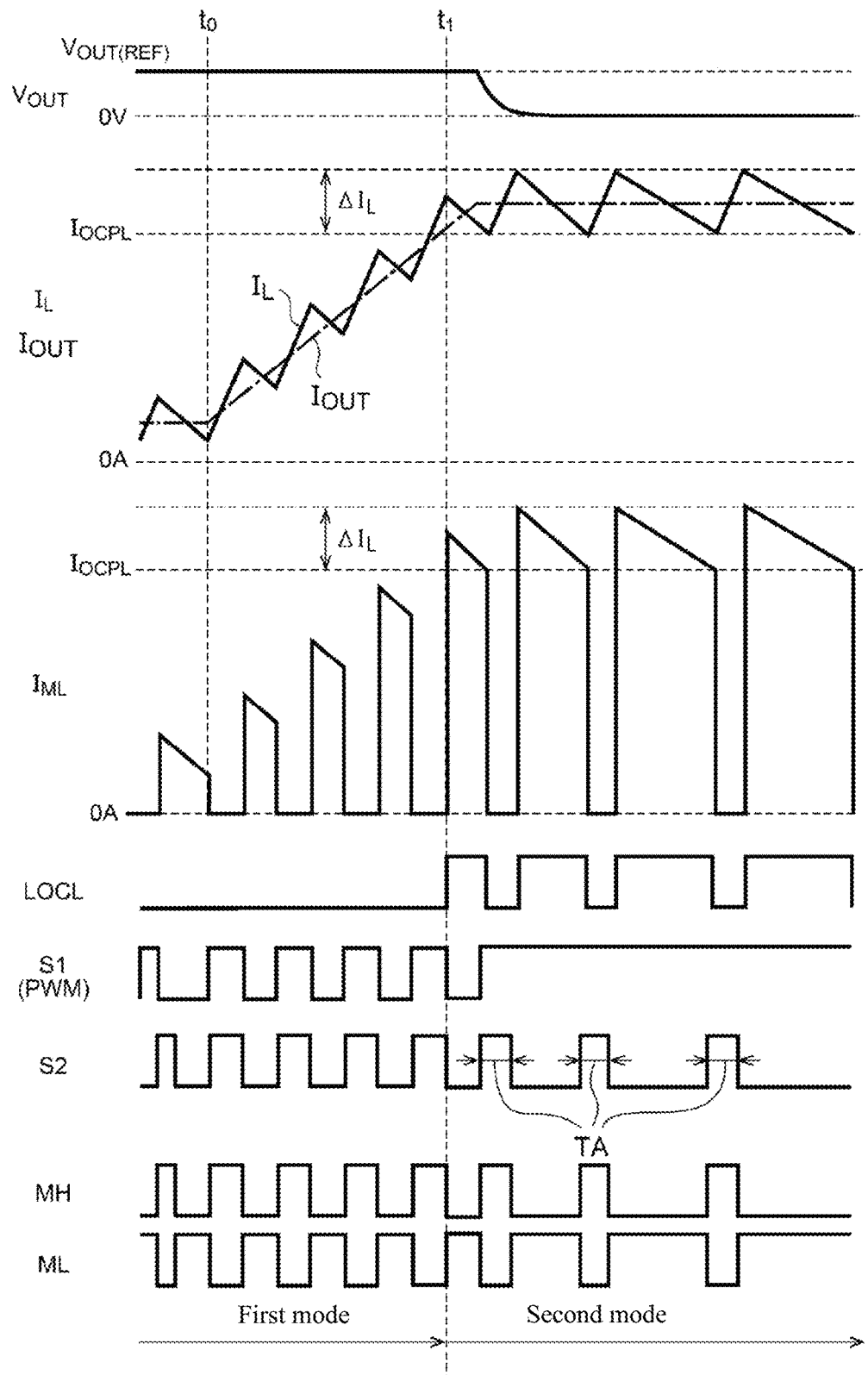
FIG. 5 is a waveform diagram illustrating shifting from a first mode to a second mode.

FIG. 5 shows a waveform diagram illustrating shifting from the first mode to the second mode.

Before the timing $t_0$, the state is normal, the DC/DC converter 100 operates in the first mode, and the output voltage $V_{OUT}$ is stabilized at the target voltage $V_{OUT(REF)}$.

At the timing $t_0$, the output line 104 is short to the ground. Accordingly, the output current $I_{OUT}$ starts rising. At the timing $t_1$, when the low-side current $I_{ML}$ exceeds the threshold current $I_{OCPL}$, the overcurrent detection signal LOCL is asserted, and the operation shifts to the second mode.

In the second mode, when the coil current $I_L$ is limited, a charging current to the output capacitor C1 is insufficient, and so the output voltage $V_{OUT}$ drops. As a result, the duty cycle of the pulse modulation signal S1 increases, and the pulse modulation signal S1 is kept at high. After that, the DC/DC converter 100 continues operating in the second mode.

Next, specific configuration examples of the blocks of the controller 200 are described below.

Figure 6:
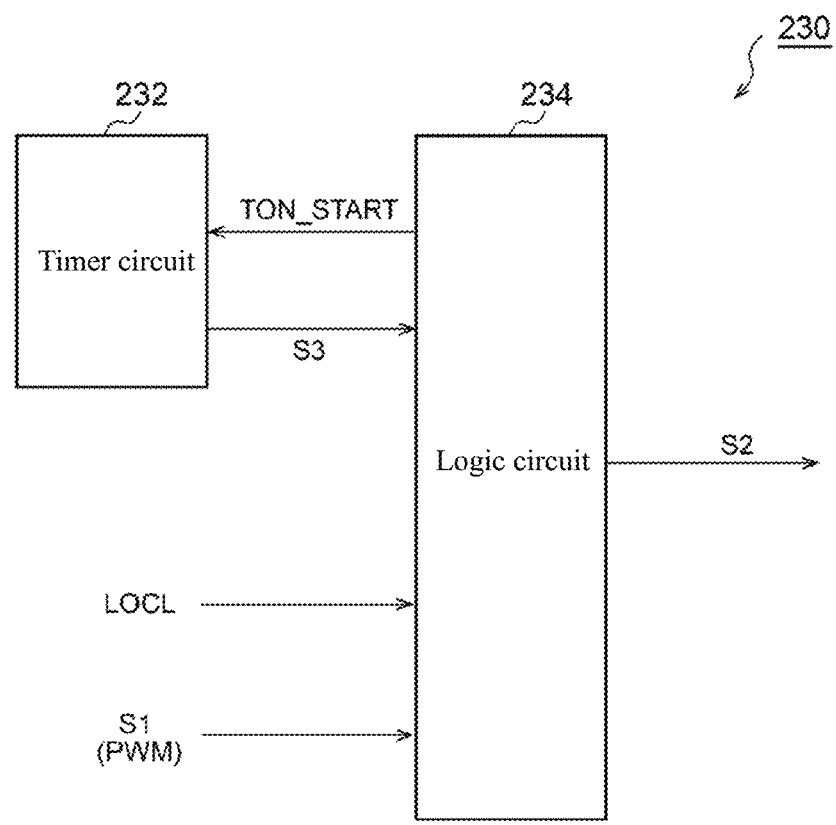
FIG. 6 is a circuit diagram of a configuration example of a switch control circuit.

FIG. 6 shows a circuit diagram of a configuration example of the switch control circuit 230. The switch control circuit 230 includes a timer circuit 232 and a logic circuit 234.

The timer circuit 232 measures the predetermined on time TA in response to a trigger TON_START from the logic circuit 234, and generates an on time ending signal S3 indicating that the predetermined on time TA has elapsed. The logic circuit 234 may generate the trigger TON_START for the timer circuit 232 based on negating of the overcurrent detection signal LOCL, or turning off of the low-side transistor ML/turning on of the high-side transistor MH.

The logic circuit 234 generates the control pulse S2 based on the pulse modulation signal S1, the overcurrent detection signal LOCL and the on time ending signal S3.

The configuration of the logic circuit 234 is not specifically defined, and the industrialist may use such as combinational circuits, sequential circuits, combined sequential circuits to design such circuit that takes the pulse modulation signal S1 and the overcurrent detection signal LOCL as an input, and generates the control pulse S2 with the coordination of the timer circuit 232.

As described above, during the operation in the second mode, the increment $\Delta I_L$ of the coil current $I_L$, that is, the fluctuation range amplitude of the low-side current $I_{ML}$ within the on time TA in the second mode is:

$$\Delta I_L = dI_L/dt*TA = (V_{IN}-V_{OUT})/L*TA.$$

Thus, when the DC/DC converter 100 is used in a platform or an application where the input voltage $V_{IN}$ is dynamically variable, if the on time TA is fixed, the fluctuation amplitude $\Delta I_L$ then varies according to the input voltage $V_{IN}$.

In addition, the output current $V_{OUT}$ of the DC/DC converter 100 is an average value of the coil current $I_L$, and the output current $I_{OUT(OCP)}$ in the second mode is represented as the equation below:

$$I_{OUT(OCP)} = I_{OCPL} + \Delta I_L/2$$

That is to say, when the fluctuation amplitude $\Delta I_L$ varies, the output current $I_{OUT}$ in an overcurrent state changes.

When a constant output current $I_{OUT}$ is desired, the fluctuation in the fluctuation amplitude $\Delta I_L$ can be inhibited by adjusting the fixed on time TA according to the input voltage $V_{IN}$, or even the output current $I_{OUT(OCP)}$ may be kept constant. More specifically, the fixed on time TA gets shorter as the input voltage $V_{IN}$ gets higher.

Moreover, the output voltage $V_{OUT}$ is basically stabilized at the target voltage $V_{OUT(REF)}$, but may drop to be close to 0 V if the function of overcurrent protection is practiced (for example, shorted to the ground). When the output voltage $V_{OUT}$ is sufficiently low relative to the input voltage $V_{IN}$ (the voltage drop is higher), influences of the output voltage $V_{OUT}$ may be omitted:

$$\Delta I_L = dI_L/dt*TA = V_{IN}/L*TA.$$

In this case, the fixed on time TA is adjusted in a manner of being inversely proportional to the input voltage $V_{IN}$.

However, when the step-down ratio is not that high, influences of the fluctuation in the output voltage $V_{OUT}$ cannot be overlooked. Thus, in this case, the fixed on time TA can be adjusted based on both the input voltage $V_{IN}$ and the output voltage $V_{OUT}$, and so the fluctuation in the fluctuation amplitude $\Delta I_L$ can be inhibited. More specifically, it may be set that the fixed on time TA gets shorter as the input voltage $V_{IN}$ is higher and the fixed on time TA gets longer as the output voltage $V_{OUT}$ is higher.

In one embodiment, the on time TA may be adjusted in a manner of being inversely proportional to a difference ($V_{IN}-V_{OUT}$) between the input voltage $V_{IN}$ and the output voltage $V_{OUT}$.

Figure 7:
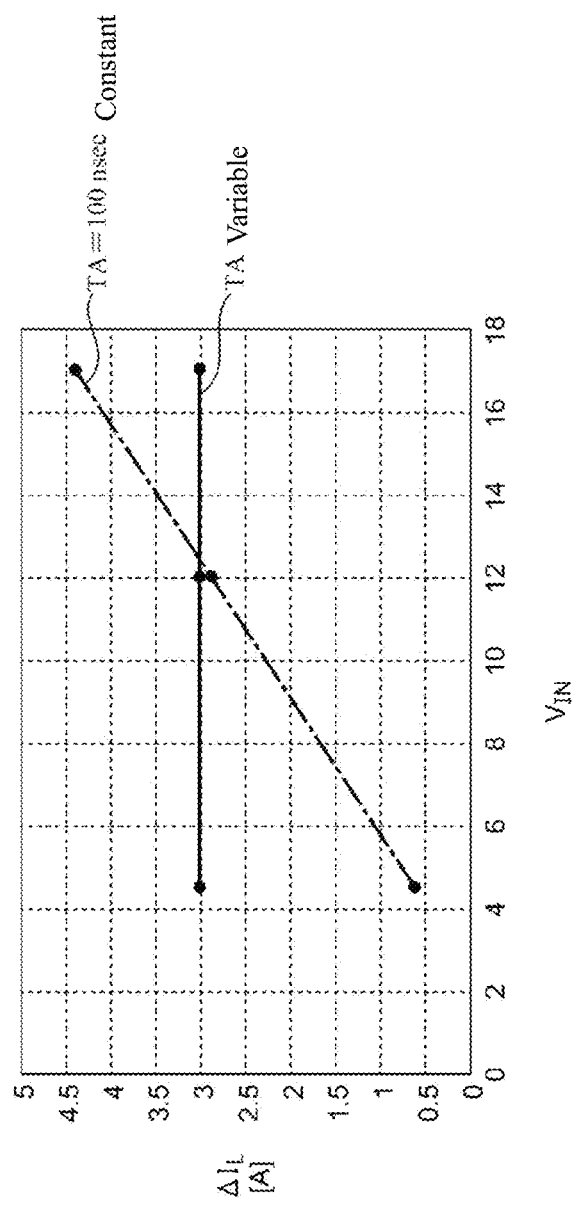
FIG. 7 is a diagram showing a relationship between a fluctuation amplitude $\Delta I_L$ of a coil current and an input voltage $V_{IN}$ in the second mode.

FIG. 7 shows a diagram of a relationship between the fluctuation amplitude $\Delta I_L$ of the coil current and the input voltage $V_{IN}$ in the second mode. In FIG. 7, characteristics when the fixed on time TA is kept constant regardless of the input voltage $V_{IN}$ and the output voltage $V_{OUT}$, and characteristics when the fixed on time TA is controlled in a manner of being proportional to the difference between the input voltage $V_{IN}$ and the output voltage $V_{OUT}$ are depicted. When the fixed on time TA is kept constant, the fluctuation amplitude $\Delta I_L$ changes as the input voltage $V_{IN}$ fluctuates; on the contrary, by adjusting the fixed on time TA, the fluctuation amplitude $\Delta I_L$ can be kept constant regardless of the fluctuation in the input voltage $V_{IN}$.

Figure 8:
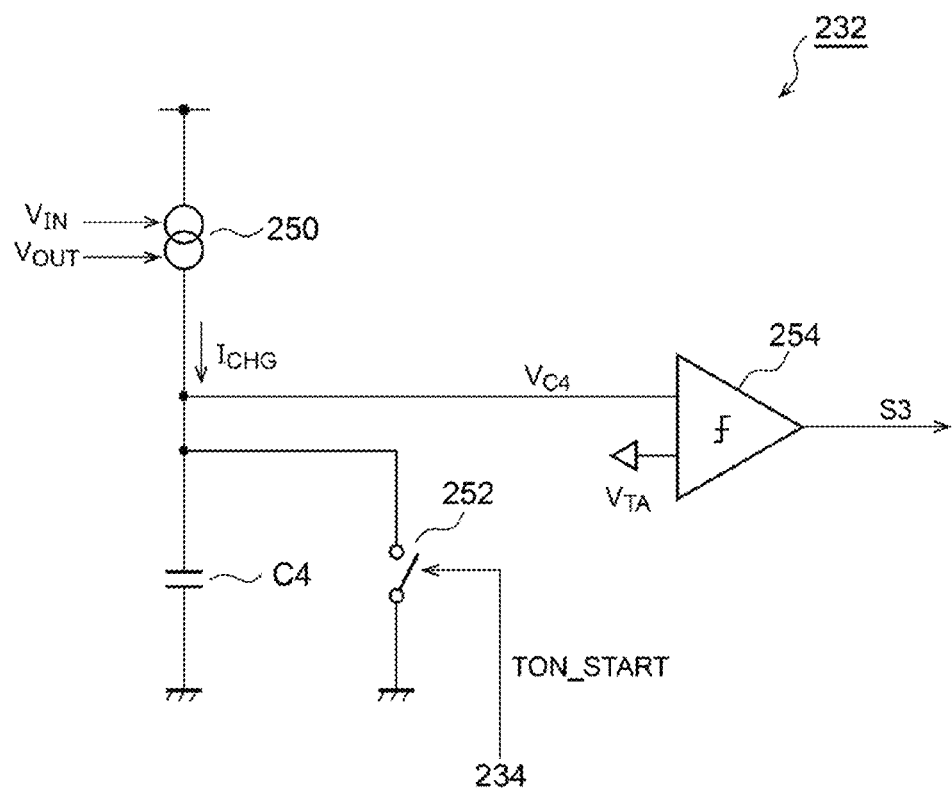
FIG. 8 is a circuit diagram of a configuration example of a timer circuit.

FIG. 8 shows a circuit diagram of a configuration example of the timer circuit 232. The timer circuit 232 includes a capacitor C4, a variable current source 250, a switch 252 and a comparator 254. A first end of the capacitor C4 is grounded. The variable current source 250 is connected to a second end of the capacitor C4, and generates a current $I_{CHG}$ proportional to the difference ($V_{IN}-V_{OUT}$) between the input voltage $V_{IN}$ and the output voltage $V_{OUT}$ and supplies the current $I_{CHG}$ to the capacitor C4. The term "gm" is a constant of proportionality.

$$I_{CHG} = gm(V_{IN}-V_{OUT})$$

The switch 252 is disposed in parallel with the capacitor C4, and is turned off in response to the trigger signal TON_START from the logic circuit 234. When the switch 252 is turned off, a voltage $V_{C4}$ of the capacitor C4 increases with a slope proportional to the current Imo with time.

$$V_{C4} = t*I_{CHG}/C4 = t*gm(V_{IN}-V_{OUT})/C4$$

The comparator 254 compares the voltage $V_{C4}$ of the capacitor C4 with a threshold voltage $V_{TA}$. An output of the comparator 254 is the on time ending signal S3. The on time ending signal S3 measures an elapsed time in response to the asserting of the trigger signal TON_START, and when the fixed on time TA has elapsed, the output of the comparator 254 changes.

The time TA from when the switch 252 is turned off to when the voltage $V_{C4}$ of the capacitor C4 reaches the threshold voltage $V_{TA}$ is:

$$TA = V_{TA}*C4/\{gm(V_{IN}-V_{OUT})\},$$

and is inversely proportional to the difference between the input voltage $V_{IN}$ and the output voltage $V_{OUT}$. Therefore, the fluctuation amplitude of the coil current $I_L$ can be kept stable during the operation in the second mode, thereby keeping the output current $I_{OUT(OCP)}$ during the operation in the second mode constant.

Figure 9:
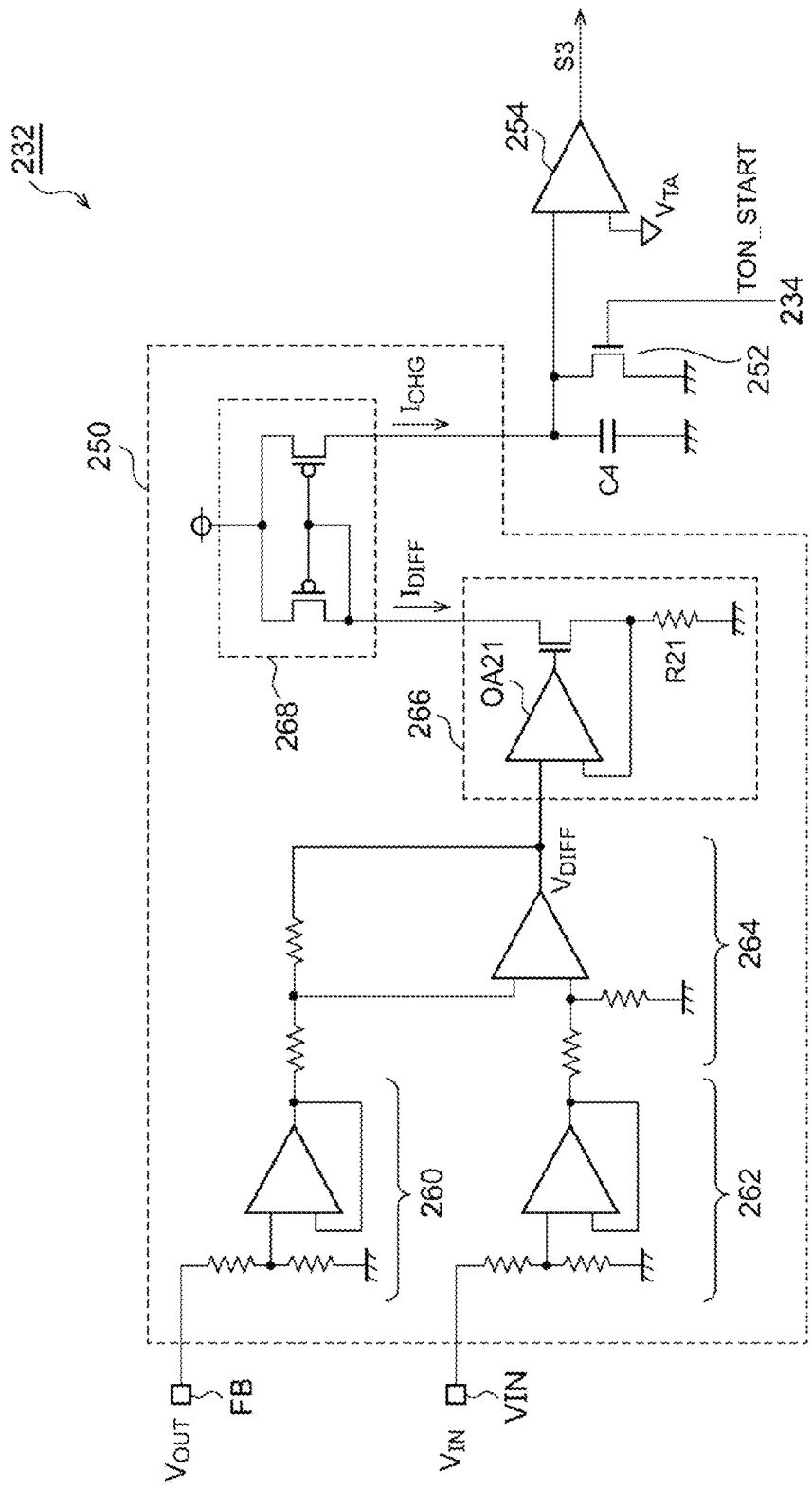
FIG. 9 is a circuit diagram of a configuration example of a timer circuit.

FIG. 9 shows a circuit diagram of a configuration example of the timer circuit 232. The variable current source 250 includes a first buffer 260, a second buffer 262, a subtraction amplifier 264, a voltage/current (V/I) conversion circuit 266 and a current mirror circuit 268. The first buffer 260 amplifies (attenuates) by an appropriate gain the output voltage $V_{OUT}$ at the pin FB. The second buffer 262 amplifies (attenuates) by an appropriate gain the input voltage $V_{IN}$ at the pin $V_{IN}$. The subtraction amplifier 264 amplifies a difference between an output of the first buffer 260 and an output of the second buffer 262 by a gain a. An output voltage $V_{DIFF}$ of the subtraction amplifier 264 is proportional to the difference between the input voltage $V_{IN}$ and the output voltage $V_{OUT}$.

$$V_{DIFF} = \alpha*(V_{IN}-V_{OUT})$$

The V/I conversion circuit 266 includes a resistor R21 and an operational amplifier (OA) 21, and converts the output voltage $V_{DIFF}$ of the subtraction amplifier 264 to a current signal $I_{DIFF}$.

$$I_{DIFF} = V_{DIFF}/R21$$

The current mirror circuit 268 returns the output current $I_{DIFF}$ of the V/I conversion circuit 266, and generates the charging current $I_{CHG}$.

Next, a configuration example of the overcurrent detection circuit 220 is described below. As described above, the overcurrent detection circuit 220 detects whether the low-side current $I_{ML}$ flowing through the low-side transistor ML exceeds the threshold value $I_{OCPL}$ based on the voltage across (the voltage across the drain and the source) the low-side transistor ML.

Figure 10:
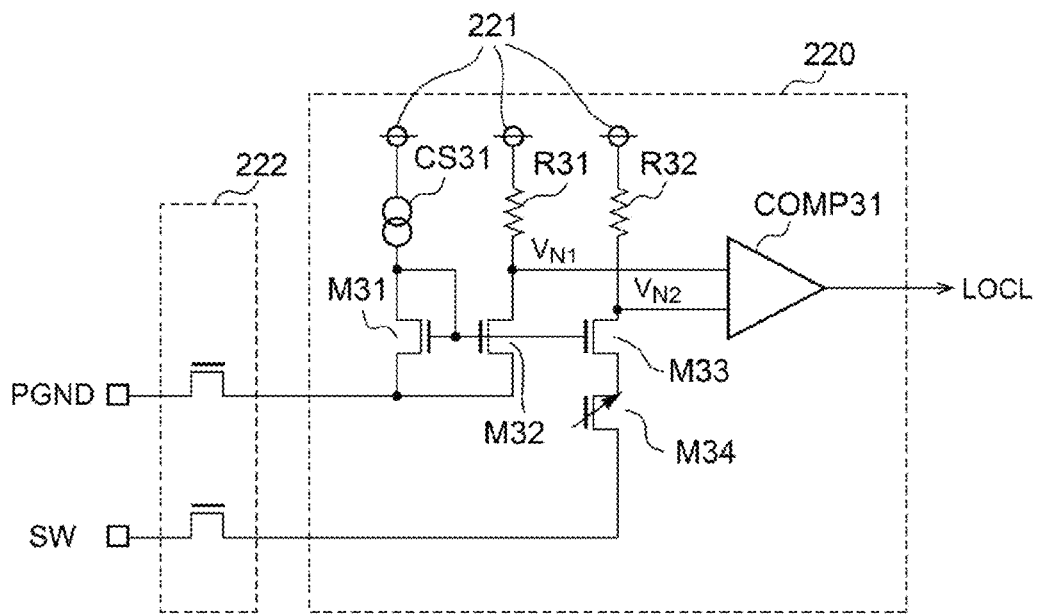
FIG. 10 is a circuit diagram of a configuration example of an overcurrent detection circuit.

FIG. 10 shows a circuit diagram of a configuration example of the overcurrent detection circuit 220. The overcurrent detection circuit 220 receives the voltage $V_{SW}$ of the switch pin SW and a voltage $V_{GND}$ (=0 V) of a ground pin PGND, and monitors whether a difference between these two voltages exceeds the threshold voltage $V_{OCPL}$ corresponding to the threshold current $I_{OCPL}$.

Alternatively, a protection circuit 222 including a transistor with a high breakdown voltage may be inserted between the overcurrent detection circuit 220 and the two pins SW and PGND.

The overcurrent detection circuit 220 includes a current source CS31, a first transistor M31, a second transistor M32, a third transistor M33, a first resistor R31, a second resistor R32, an impedance element M34, and a voltage comparator COMP31.

The current source CS31 and the first transistor M31 are connected in series between the power supply line 221 and the ground pin (the ground line) PGND. The current source C31 is disposed between a gate and a drain of the first transistor M31. The first resistor R31 and the second transistor M32 are connected in series between the power supply line 221 and the switch pin (the switching line) SW. A gate of the second transistor M32 is connected to the gate of the first transistor M31. The second resistor R32, the third transistor M33 and the impedance element M34 are connected in series between the power supply line 221 and the ground line PGND. A gate of the third transistor M33 is connected to the gates of the first transistor M31 and the second transistor M32.

The impedance element M34 may be implemented by a resistance element, or a transistor with an appropriately biased control terminal.

The voltage comparator COMP31 compares a voltage $V_{N1}$ of a connection node of the first resistor R31 and the second transistor M32 with a voltage $V_{N2}$ of a connection node of the second resistor R32 and the third transistor M33, and outputs the overcurrent detection signal LOCL indicating a comparison result.

The voltage $V_{N1}$ is a voltage obtained by level-shifting the voltage at the pin PGND in a positive direction by a shift $\Delta V1$, and the voltage $V_{N2}$ is a voltage obtained by level-shifting a voltage at the pin SW in a positive direction by a shift $\Delta V2$. A difference $\Delta V = \Delta V2 - \Delta V1$ between the shifts is determined according to the impedance of the impedance element M34.

That is to say, the voltage comparator COMP31 compares the two voltages $V_{N1}$ and $V_{N2}$.

$$V_{N1} = \Delta V1$$

$$V_{N2} = V_{SW} + \Delta V2 = V_{SW} + \Delta V1 + \Delta V$$

The output LOCL of the voltage comparator COMP31 indicates a comparison result between $-V_{SW}$ and $\Delta V$. During the on time of the low-side transistor ML, $V_{SW}$ is a negative voltage, and so $-V_{SW}$ represents an absolute value $|V_{SW}|$ of the voltage $V_{SW}$ at the switch pin SW, and is thus represented as $R_{ON}*I_{ML}$. In the above, $R_{ON}$ is an on resistance of the low-side transistor ML. That is to say, the overcurrent detection signal LOCL represents a comparison result between the low-side current $I_{ML}$ and the threshold current $I_{OCPL}$ substantially equivalent to $\Delta V/R_{ON}$.

In this circuit, the threshold current $I_{OCPL}$ is determined by $\Delta V$, that is, the impedance of the impedance element M34. When a transistor is used as the impedance element M34, the threshold current $I_{OCPL}$ can be adjusted according to a bias voltage applied to a control terminal thereof.

Further, the impedance (on resistance) of the impedance element M34 preferably has the same temperature dependence as the on resistance of the low-side transistor ML, and so the impedance element M34 may be implemented by the same transistor as the low-side transistor ML (an N-channel MOSFET in this embodiment). Accordingly, when the on resistance of the low-side transistor ML fluctuates as temperature changes, the on resistance of the impedance element M34 also fluctuates, and so the threshold current $I_{OCPL}$ can be kept constant.

Figure 11:
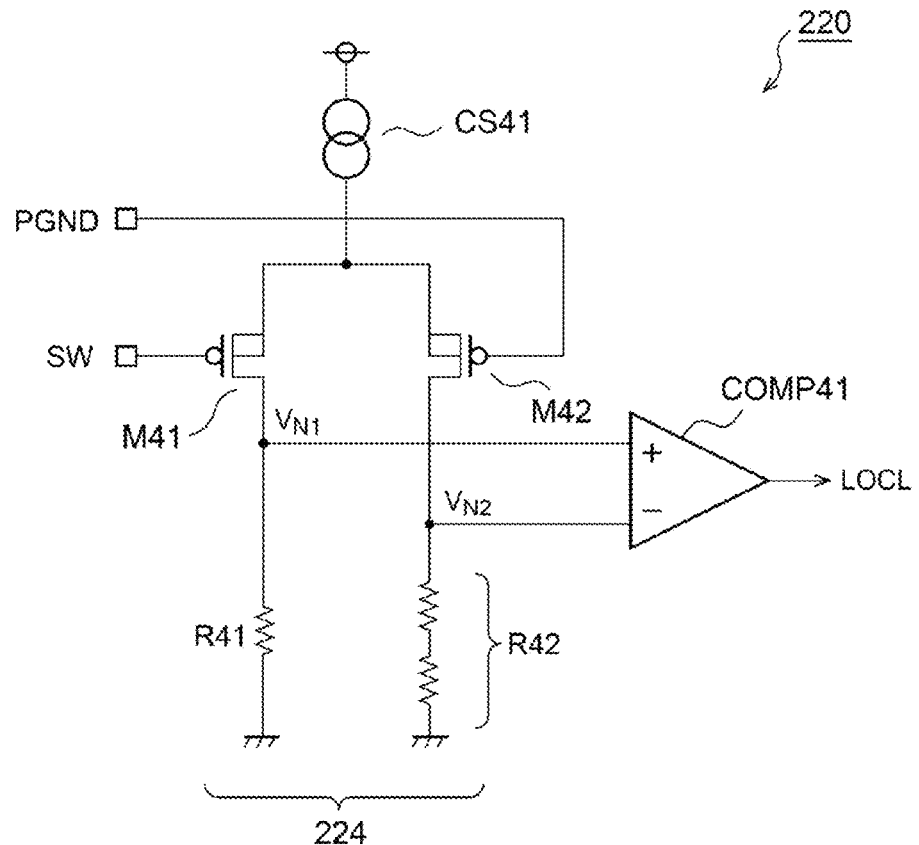
FIG. 11 is a circuit diagram of another configuration example of an overcurrent detection circuit.

FIG. 11 shows a circuit diagram of another configuration example of the overcurrent detection circuit 220. The overcurrent detection circuit 220 includes a differential amplifier 224 and a voltage comparator COMP41. The differential amplifier 224 includes a tail current source CS41, an input differential pair M41 and M42 formed by a PMOS transistor (or a PNP bipolar transistor), and resistor-load circuits R41 and R42 with unbalanced impedance. One (M41) of the input differential pair M41 and M42 is connected to a first end (the drain) of the low-side transistor ML, that is, connected to the switch pin SW, and the other (M42) of the input differential pair M41 and M42 is connected to a second end (the source) of the low-side transistor ML, that is, the ground pin PGND.

The voltage comparator COMP41 compares the voltages $V_{N1}$ and $V_{N2}$ of two connection nodes of the input differential pair M41 and M42 and the resistor-load circuits R41 and R42, and outputs the overcurrent detection signal LOCL indicating a comparison result.

Figure 12:
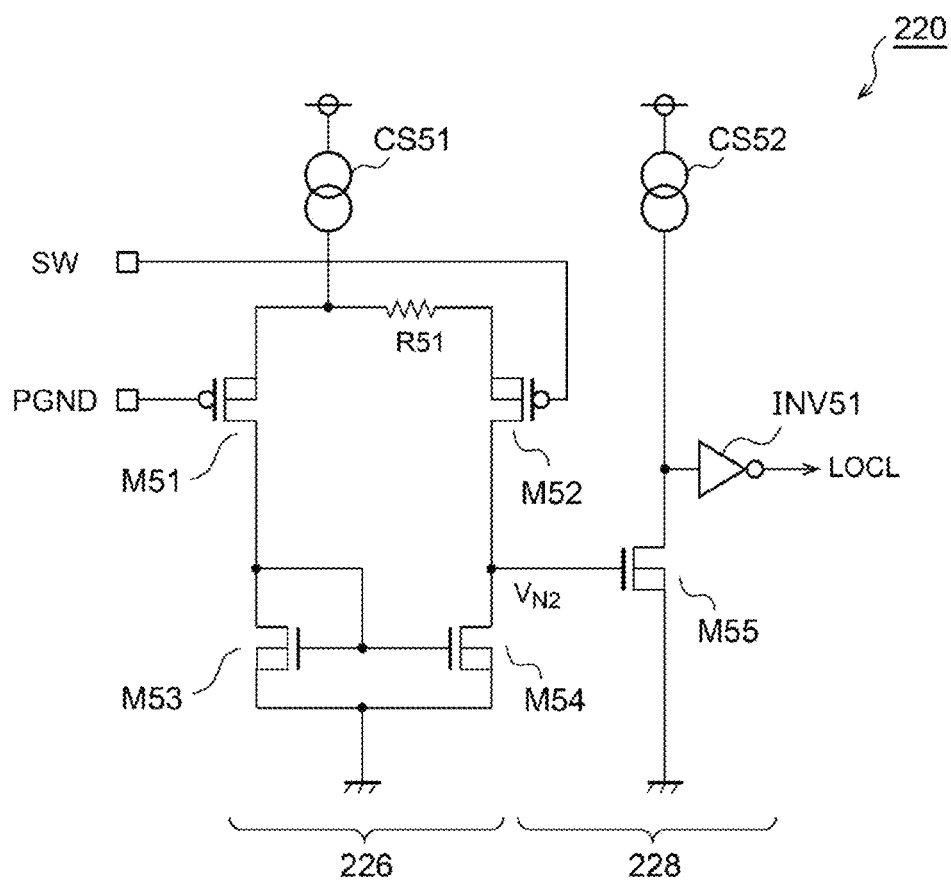
FIG. 12 is a circuit diagram of yet another configuration example of an overcurrent detection circuit.

FIG. 12 shows a circuit diagram of yet another configuration example of the overcurrent detection circuit 220. The overcurrent detection circuit 220 includes a differential amplifier 226 and an output stage 228.

The differential amplifier 226 includes a tail current source CS51, an input differential pair M51 and M52 formed by a PMOS transistor (or a PNP bipolar transistor), current mirror loads M53 and M54, and an impedance element R51 inserted between one M52 of the input differential pair and the tail current source CS51.

The output stage 228 binarizes voltages $V_{N2}$ of the input differential pair M51 and M52 and one of two connection nodes of the current mirror loads M53 and M54. For example, the output stage 228 includes a transistor M55, a current source CS52 and an inverter INV51.

The configuration of the overcurrent detection circuit 220 is not limited to the examples shown herein.

(Use)

Figure 13:
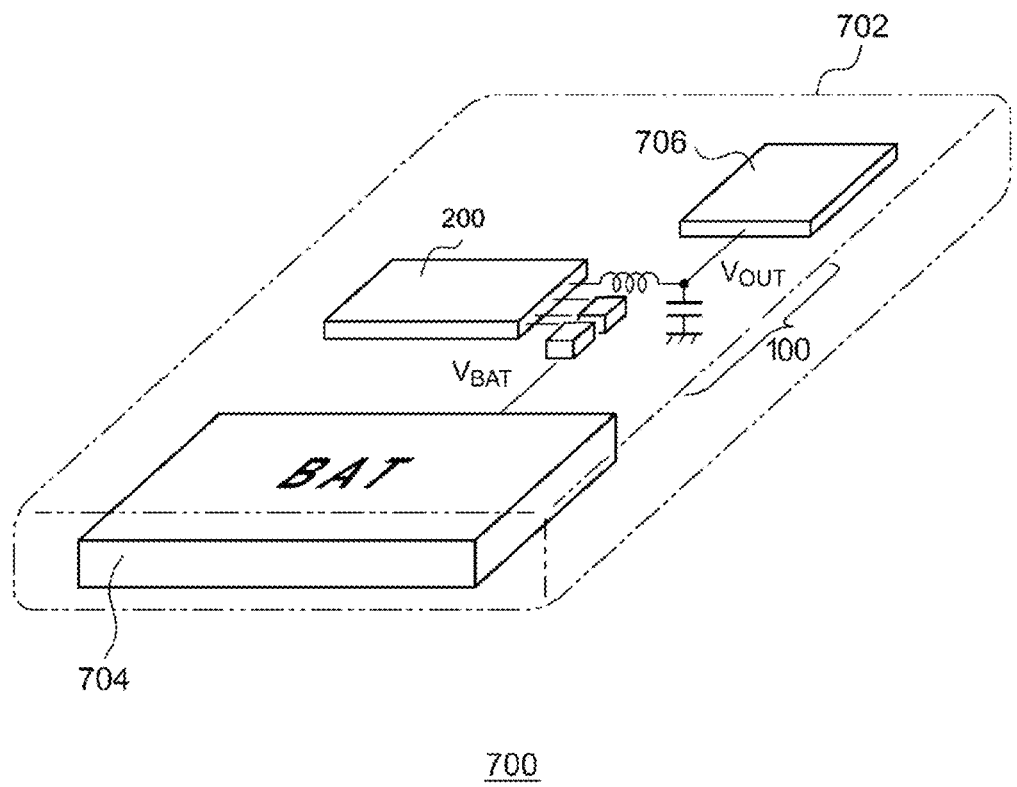
FIG. 13 is a diagram of an example of an electronic device having a buck DC/DC converter.

FIG. 13 shows a diagram of an example of an electronic device 700 having the buck DC/DC converter 100 of the embodiment. The electronic device 700 is, for example, a battery driven device such as a cellphone terminal, a digital camera, a digital video recorder, a tablet terminal, or a portable audio player. The electronic device 700 includes a housing 702, a battery 704, a microprocessor 706 and the DC/DC converter 100. The DC/DC converter 100 has an input terminal to receive a battery voltage $V_{BAT}$ (=$V_{IN}$) from the battery 704, and supplies an output voltage $V_{OUT}$ to the microprocessor 706 or other loads connected to the output terminal.

The type of the electronic device 700 is not limited to being a battery driven device, and may be an on-vehicle device, or may be an office automation (OA) device such as a fax machine, or even be an industry device.

The embodiments described with specific terms are for conveying principles and applications of the present disclosure only, and variations and modifications to the configurations may be made to these embodiments without departing from the conceptive scope of the present disclosure defined in the appended claims.

The invention claimed is:

1. A controller, for a synchronous rectification type buck DC/DC converter including a high-side transistor and a low-side transistor, the controller comprising:
   a pulse modulator, generating a pulse modulation signal, wherein a first level and a second level of the pulse modulation signal are taken such that an output of the buck DC/DC converter is pulse-modulated to approach a target state, the first level instructing the high-side transistor to be turned on and the low-side transistor to be turned off, and the second level instructing the high-side transistor to be turned off and the low-side transistor to be turned on;
   an overcurrent detection circuit, comparing a low-side current flowing through the low-side transistor with a predetermined overcurrent threshold value to generate an overcurrent detection signal that is asserted when the low-side current is greater than the overcurrent threshold value;
   a switch control circuit, at least based on the overcurrent detection signal and the pulse modulation signal, generating a control pulse that takes a first level during a period when the high-side transistor should be on and the low-side transistor should be off, and takes a second level during a period when the high-side transistor should be off and the low-side transistor should be on; and
   a driver circuit, driving the high-side transistor and the low-side transistor in response to the control pulse, wherein
   (i) in a first mode, the control pulse corresponds to the pulse modulation signal, and
   (ii) in a second mode, the control pulse takes the second level for the period during which the overcurrent detection signal is asserted and takes the first level during a fixed on time after the overcurrent detection signal is negated.

2. The controller of claim 1, wherein the switch control circuit,
   in the second mode when the overcurrent detection signal is negated and if the pulse modulation signal is at the first level, maintains the second mode, and
   in the second mode when the overcurrent detection signal is negated and if the pulse modulation signal is at the second level, the second mode shifts to the first mode.

3. The controller of claim 1, wherein the switch control circuit shifts to the second mode when the overcurrent detection signal is asserted in the first mode.

4. The controller of claim 1, wherein the switch control circuit includes a timer circuit that operates with a transition of the control pulse to the second level as a trigger to measure the fixed on time, wherein
   when the overcurrent detection signal is negated, the pulse modulation signal is output as the control pulse,
   when the overcurrent detection signal is asserted, the control pulse is set as the second level,
   when the pulse modulation signal is at the first level and while the overcurrent detection signal is negated, the control pulse is set to the first level during the fixed on time, and
   when the pulse modulation signal is at the second level and while the overcurrent detection signal is negated, the pulse modulation signal is output as the control pulse.

5. The controller of claim 4, wherein the timer circuit includes:
   a capacitor;
   a variable current source, generating a current proportional to a difference between an input voltage and an output voltage of the buck DC/DC converter, and supplying the current to the capacitor;
   a switch, disposed in parallel with the capacitor; and
   a voltage comparator, comparing a voltage of the capacitor with a predetermined threshold voltage.

6. The controller of claim 1, wherein the overcurrent detection circuit compares a voltage across the low-side transistor with a threshold voltage corresponding to the overcurrent threshold value.

7. The controller of claim 6, wherein the overcurrent detection circuit includes:
   a first transistor and a current source, connected in series between a power supply line and a ground line connected to one end of the low-side transistor, wherein the current source is disposed between a gate and a drain of the first transistor;
   a second transistor and a first resistor, connected in series between the power supply line and a switching line connected to the other end of the low-side transistor, wherein a gate of the second transistor is connected to the gate of the first transistor;
   a third transistor, a second resistor and an impedance element, connected in series between the power supply line and the ground line, wherein a gate of the third transistor is connected to the gate of the first transistor; and
   a voltage comparator, comparing a voltage of a connection node of the first resistor and the second transistor with a voltage of a connection node of the second resistor and the third transistor.

8. The controller of claim 6, wherein the overcurrent detection circuit includes:
   a differential amplifier, including:
   a tail current source;

an input differential pair having a PMOS transistor or a PNP bipolar transistor; and
a resistor-load circuit with unbalanced impedance; and
a voltage comparator, comparing voltages of two connection nodes of the input differential pair with the resistor-load circuit, wherein
one of the input differential pair is connected to a first end of the low-side transistor, and
the other of the input differential pair is connected to a second end of the low-side transistor.

9. The controller of claim 6, wherein the overcurrent detection circuit includes:
a differential amplifier, including:
a tail current source;
an input differential pair having a PMOS transistor or a PNP bipolar transistor;
a current mirror load; and
an impedance element inserted between one of the input differential pair and the tail current source; and
an output stage, binarizing voltages of the input differential pair and one of two connection nodes of the current mirror load.

10. The controller of claim 1, wherein when an input voltage of the buck DC/DC converter is higher, the fixed on time is shorter.

11. The controller of claim 1, wherein when an output voltage of the buck DC/DC converter is higher, the fixed on time is longer.

12. The controller of claim 1, wherein the fixed on time is inversely proportional to a difference between the input voltage and the output voltage of the buck DC/DC converter.

13. The controller of claim 1, wherein the controller is integrated on a semiconductor substrate.

14. A buck DC/DC converter, comprising the controller of claim 1.

15. An electronic device, comprising the controller of claim 1.

16. A controller, for a synchronous rectification type buck DC/DC converter including a high-side transistor and a low-side transistor, the controller comprising:
a pulse modulator, generating a pulse modulation signal, wherein a first level and a second level of the pulse modulation signal are taken such that an output of the buck DC/DC converter is pulse-modulated to approach a target state, the first level instructing the high-side transistor to be turned on and the low-side transistor to be turned off, and the second level instructing the high-side transistor to be turned off and the low-side transistor to be turned on;
an overcurrent detection circuit, comparing a low-side current flowing through the low-side transistor with a predetermined overcurrent threshold value to generate an overcurrent detection signal that is asserted when the low-side current is greater than the overcurrent threshold value;
a switch control circuit, at least based on the overcurrent detection signal and the pulse modulation signal, generating a control pulse that takes a first level during a period when the high-side transistor should be on and the low-side transistor should be off, and takes a second level during a period when the high-side transistor should be off and the low-side transistor should be on; and
a driver circuit, driving the high-side transistor and the low-side transistor in response to the control pulse, wherein when the overcurrent detection signal is negated, the pulse modulation signal is output as the control pulse,
when the overcurrent detection signal is asserted, the control pulse is set as the second level,
when the pulse modulation signal is at the first level and while the overcurrent detection signal is negated, the control pulse is set to the first level during a fixed on time, and
when the pulse modulation signal is at the second level and while the overcurrent detection signal is negated, the pulse modulation signal is output as the control pulse.

17. A controlling method for a synchronous rectification type buck DC/DC converter including a high-side transistor and a low-side transistor, the controlling method comprising:
generating a pulse modulation signal, wherein a first level and a second level of the pulse modulation signal are taken such that an output of the buck DC/DC converter is pulse-modulated to approach a target state, the first level instructing the high-side transistor to be turned on and the low-side transistor to be turned off, and the second level instructing the high-side transistor to be turned off and the low-side transistor to be turned on;
comparing a low-side current flowing through the low-side transistor with a predetermined overcurrent threshold value to generate an overcurrent detection signal that is asserted when the low-side current is greater than the overcurrent threshold value;
at least based on the overcurrent detection signal and the pulse modulation signal, generating a control pulse that takes a first level during a period when the high-side transistor should be on and the low-side transistor should be off, and takes a second level during a period when the high-side transistor should be off and the low-side transistor should be on; and
driving the high-side transistor and the low-side transistor in response to the control pulse, wherein
(i) in a first mode, the control pulse corresponds to the pulse modulation signal, and
(ii) in a second mode, the control pulse takes the second level for the period during which the overcurrent detection signal is asserted and takes the first level during a fixed on time after the overcurrent detection signal is negated.

18. The controlling method of claim 17, wherein the fixed on time is inversely proportional to a difference between an input voltage and an output voltage of the buck DC/DC converter.

19. A controlling method for a synchronous rectification type buck DC/DC converter including a high-side transistor and a low-side transistor, the controlling method comprising:
generating a pulse modulation signal, wherein a first level and a second level of the pulse modulation signal are taken such that an output of the buck DC/DC converter is pulse-modulated to approach a target state, the first level instructing the high-side transistor to be turned on and the low-side transistor to be turned off, and the second level instructing the high-side transistor to be turned off and the low-side transistor to be turned on;
comparing a low-side current flowing through the low-side transistor with a predetermined overcurrent threshold value to generate an overcurrent detection signal that is asserted when the low-side current is greater than the overcurrent threshold value;

at least based on the overcurrent detection signal and the pulse modulation signal, generating a control pulse that takes a first level during a period when the high-side transistor should be on and the low-side transistor should be off, and takes a second level during a period when the high-side transistor should be off and the low-side transistor should be on; and driving the high-side transistor and the low-side transistor in response to the control pulse, wherein the generating of the control pulse includes:

outputting the pulse modulation signal as the control pulse when the overcurrent detection signal is negated;

setting the control pulse to the second level when the overcurrent detection signal is asserted;

setting the control pulse to the first level during the fixed on time when the pulse modulation signal is at the first level and while the overcurrent detection signal is negated;

outputting the pulse modulation signal as the control pulse when the pulse modulation signal is at the second level and while the overcurrent detection signal is negated.

20. The controlling method of claim 19, wherein the fixed on time is inversely proportional to a difference between an input voltage and an output voltage of the buck DC/DC converter.

* * * * *